United States Patent [19]

Yamamoto

[11] 4,029,457

[45] June 14, 1977

[54] MOLDING MACHINE

[75] Inventor: Rikichi Yamamoto, Numazu, Japan

[73] Assignee: Toshiba Kikai Kabushiki Kaisha, Tokyo, Japan

[22] Filed: Jan. 26, 1976

[21] Appl. No.: 652,111

Related U.S. Application Data

[63] Continuation-in-part of Ser. No. 479,629, June 17, 1974, abandoned.

[52] U.S. Cl. .............................. 425/167; 425/416; 425/423; 425/451
[51] Int. Cl.[2] .................................... B29C 3/06
[58] Field of Search ............ 425/251, 451.9, 451.2, 425/DIG. 220, DIG.221, DIG. 222, DIG. 223, 135, 150, 162, 451, 416, 423, 167

[56] References Cited

UNITED STATES PATENTS

| 2,498,264 | 2/1950 | Goldhard | 425/162 |
| 3,465,387 | 9/1969 | Allard et al. | 425/DIG. 223 |
| 3,716,323 | 2/1973 | Classen | 425/451.2 |

Primary Examiner—Robert L. Spicer, Jr.
Attorney, Agent, or Firm—Spensley, Horn and Lubitz

[57] ABSTRACT

In a molding machine of the type wherein a movable die plate carrying a movable mold is moved toward a stationary mold, the movable die plate is locked by a locking member to the tie bars, and then the mold tightening cylinder is operated to strongly urge the movable mold against the stationary mold, the locking member is operated by an electric actuator before the movable mold engages the stationary mold, or while the movable die plate is still being moved toward the stationary mold.

7 Claims, 4 Drawing Figures

FIG. I

PRIOR ART

MOLDING MACHINE

CROSS-REFERENCES TO RELATED APPLICATIONS

This application is a continuation in part of applicants prior application Ser. No. 479,629 filed on June 17, 1974, and now abandoned.

BACKGROUND OF THE INVENTION

This invention relates to a molding machine such as an injection molding machine or a die cast machine and more particularly to the improvement of the mold tightening apparatus utilized in such molding machine.

With the recent trend of increasing the capacity of the molding machine of the type described above, and for the purpose of decreasing the weight and floor space occupied by the machine as well as the price and operating cost thereof, decreasing the size of the liquid pressure actuator and increasing the operating speed of the machine, it has been proposed to use two operating cylinders, namely a boost cylinder for moving the movable die plate for opening and closing the mold, and a mold tightening cylinder for strongly urging the movable mold against the stationary mold instead of using a single cylinder for moving the die plate and tightening the molds.

FIG. 1 of the accompanying drawing diagrammatically illustrates one example of such a two cylinder type molding machine comprising a stationary metal mold 1 secured to a stationary die plate 2 securely mounted on a bed, not shown, a stationary plate 3 also secured to the bed, and tie bars 4 extending between plates 2 and 3. The lefthand ends of the tie bars 4 slidably extend through the openings of the stationary plates 3, whereas the righthand ends slidably extends through openings of the stationary die plate 2 and are terminated with pistons 5 contained in cylinders 6 fastened to the stationary die plate 2. The lefthand halves of tie bars 4 are formed with screw threads or a plurality of axially spaced circumferential grooves. There is also provided a movable metal mold 7 supported by a movable die plate 8 for cooperation with stationary mold 1. The movement of the movable die plate 8 is guided by tie bars 4. Locking members in the form of split lock nuts 9 formed on their inner surfaces with threads or axially spaced circumferential ribs adapted to engage the threads or grooves of the tie bars 4 are mounted on one side of the movable die plates 8 to be slidable in the radial direction with respect to the longitudinal axes of the tie bars 4. Thus, when the locking members are caused to engage or clamp the tie bars, the movable die plates 8 and tie bars 4 are locked together so that they are moved in unison. Above one of the cylinders 6 is mounted a boost cylinder 10 whose piston rod 11 is connected to the movable die plate 8. With this construction, when pressurized liquid is admitted into the lefthand chamber in the boost cylinder 10 while the stationary and movable molds 1 and 7 are separated the movable die plate 8 will be moved to the right along the tie bars. At the end of the stroke of the piston in boost cylinder 10, the locking members 9 are moved toward tie bars 4, in a manner to be described later, thus locking the movable die plate 8 to the tie bars 4. Then, the pressurized liquid is admitted into the lefthand chamber of mold tightening cylinder 6 for urging the movable mold 7 against the stationary mold 1 under a high pressure.

With this arrangement, however, as the movable die plate 8 is locked to the tie bars by advancing radially inwardly the locking members 9 when the stroke of the piston in the boost cylinder 10 has completed, the time required for advancing the locking members causes in the decrease in the production speed.

SUMMARY OF THE INVENTION

It is an object of this invention to provide an improved molding machine capable of eliminating the defect described above, thereby increasing the production speed.

Another object of this invention is to provide an improved molding machine including means for coupling the movable die plate to the mold tightening cylinder before the movable mold engages the stationary mold, or while the movable die plate is still being moved toward the stationary mold.

According to this invention there is provided a molding machine of the type comprising a stationary mold mounted on a stationary die plate, a movable mold carried by a movable die plate movable along tie bars, a boost cylinder coupled to the movable die plate for moving the movable die plate toward and away from the stationary die plate, at least one mold tightening cylinder coupled to the tie bars for strongly urging the movable mold against the stationary mold, and a locking member for locking the movable die plate to said tie bars, characterized in that electric contacts are arranged to be closed by the movement of the movable die plate before the movable mold engages the stationary mold and that an electric signal generated by the closure of the electric contacts energizes electric actuating means for actuating the locking member while the movable member is still moving toward the stationary mold.

According to one embodiment of this invention, the locking member is mounted on the movable die plate to be movable toward the tie bar which is operated by the mold tightening cylinder, a supporting plate is connected to the tie bar, a rod is mounted on the movable die plate to extend through the supporting plate, a stop member is mounted on one end of the rod protruding from the supporting plate and switch means is provided to be operated when the stop member engages the supporting plate for generating an electric signal which is used to actuate the locking member thus locking the movable die plate to the tie bar. In this manner, before the movable mold engages the stationary mold the movable die plate is locked to the tie bar so that it is possible to tighten the molds as soon as they are caused to engage with each other. Thus, the time required for locking the movable die plate to the mold tightening cylinder does not increase the overall operating time of the molding machine.

In a modified embodiment, the stop member is fixed to the tie bar so that when the movable die plate engages the stop member an electrical signal for operating the locking member is generated.

In another modification, the piston of the mold tightening cylinder is made hollow and a compression rod is connected to the movable die plate to extend through the hollow cylinder. A stop member is mounted on one end of the compression rod protruding beyond the hollow cylinder for generating an electrical signal when the stop member engages one end of the hollow cylinder. The locking member responsive to the electrical signal is mounted on the opposite end of the hollow cylinder so as to couple the movable die plate to the hollow cylinder of the mold tightening cylinder.

BRIEF DESCRIPTION OF THE DRAWINGS

Further objects and advantages of the invention will be more fully understood from the following detailed description taken in conjunction with the accompanying drawings in which.

DESCRIPTION OF THE PREFERRED EMBODIMENTS

Figure 1:
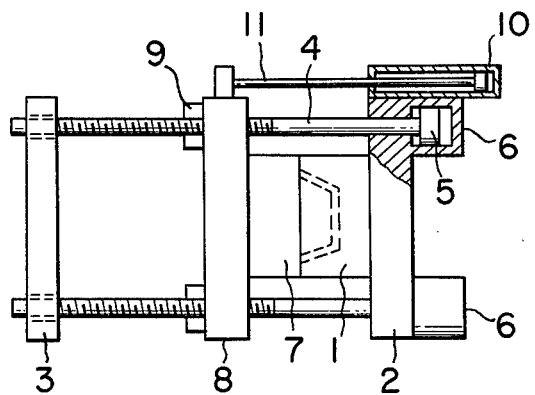
FIG. 1 is a diagrammatic representation, partly in section, of a prior art injection molding machine utilizing two operating cylinders.
Figure 2:
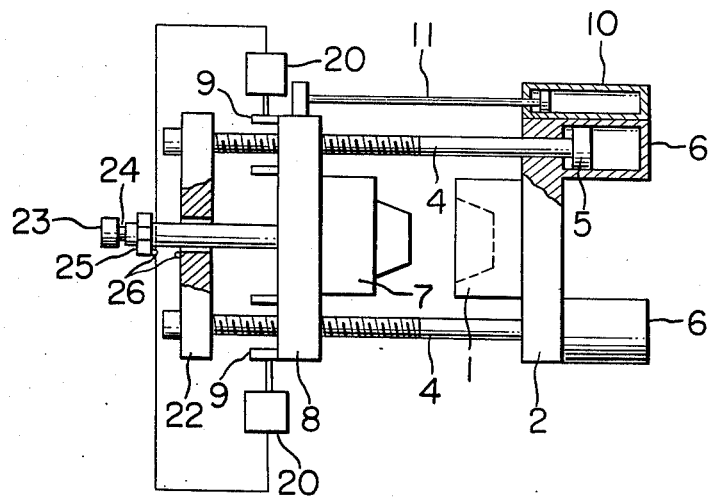
FIG. 2 is a diagrammatic representation, partly in section, of one embodiment of this invention.

Referring now to FIG. 2 of the accompanying drawings illustrating one embodiment of the invention, elements designated by reference numerals 1 to 11 inclusive are identical to those shown in FIG. 1. However, in this embodiment the stroke of the pistons 5 contained in the mold tightening cylinders 6 is made larger than that of the pistons 5 shown in FIG. 1. A supporting plate 22 is secured to the outer ends of tie bars 4. A bar 23 is connected to the lefthand side of the movable die plate 8 and extends through a central opening of the supporting plate 22. A plurality of circumferential grooves 24 are formed near the outer end of the bar 23, the number of the grooves 24 being determined in accordance with the thicknesses of the molds 1 and 7. A stop ring 25 is removably fitted in one of the grooves 24.

In operation, upon admission of pressurized liquid into the lefthand chamber of the boost cylinder 10, the movable die plate 8 is moved to the right. A little before engagement of stop ring 25 and supporting plate 22, the quantity of the pressurized liquid admitted into boost cylinder 10 is decreased thereby decelerating the righthand movement of the movable die plate 8. Then, upon engagement of stop ring 25 against supporting plate 22, tie bars 4 are also moved to the right. When a command signal for advancing the locking members 9 is generated by electric contacts 26 or a switch, not shown, which are disposed to be closed at an instant when the stop ring 25 engages the supporting plate 22, the locking members 9 constructed as above described are caused to engage the tie bars by suitable actuating means 20, for example electromagnetically operated plungers or electrohydraulic actuaters connected to be energized by the command signal while these bars are still being moved to the right so that it is possible to cause the locking members 9 to engage the tie bars 4 before completion of the stroke of the piston of the boost cylinder 10.

Although illustrated diagrammatically, actually the actuating means 20 are mounted on the movable die plate 8 so as to move the locking members 9 in the axial direction along one side of the movable die plate 8. When movable mold 7 engages stationary mold 1, mold tightening piston 5 is operated in a manner well known in the art. For example, when movable mold 7 engages stationary mold 1, a microswitch, not shown, is operated to energize a valve for admitting operating fluid to the left of the piston 5 to urge the movable mold 7 against the stationary die 1.

Although not shown in the drawing, molten metal or plasticized resinous material is injected into the cavity defined by the molds 1 and 7 under a high pressure usually through the stationary mold. According to this invention, it is possible to operate the mold tightening cylinders 6 at the same time when the movable mold 7 engages the stationary mold 1. When compared with the prior art arrangement wherein the tie bars and the movable die plate are locked together only after the piston of the boost cylinder 10 has completed its stroke, according to this invention as the locking of the movable die plate to the tie bars is performed during the stroke of the piston of the boost cylinder 10 it is possible to decrease the operating time of the molding machine by the time required for advancing the locking members thereby decreasing the overall operating time of the molding machine.

Figure 3:
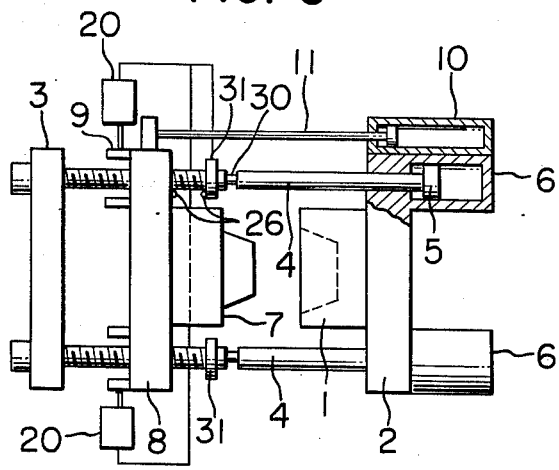
FIG. 3 is a view similar to FIG. 2, but illustrating a modified embodiment of this invention.

In a modified embodiment of this invention shown in FIG. 3, elements designated by reference numerals 1 to 11 inclusive, 20 and 26 are identical to those shown in FIGS. 1 or 2. In this embodiment, at about the central portions of tie bars, there are provided a plurality of circumferential grooves 30 of the number determined by the thicknesses of the metal molds 1 and 7 for receiving stop rings 31 each divided into two halves for mounting and dismounting.

The operation of this embodiment is similar to that of the embodiment shown in FIG. 2. Thus, a short time before engagement of the righthand side of the movable die plate 8 and the stop rings 31 the quantity of the pressurized liquid admitted into boost cylinder 10 is decreased thereby decelerating the movable die plate 8. At the time when the movable die plate 8 engages the stop ring 31 contacts 26 are closed so that a command signal for radially advancing the locking members 9 is applied to actuating means 20 thereby locking the movable die plate 8 to the tie bars 4 while the former is moving at a low speed. When the piston of the boost cylinder 10 completes its stroke, pressurized liquid is admitted into the lefthand chamber of mold tightening cylinder 6 thus urging movable mold against stationary mold under a high pressure.

Figure 4:
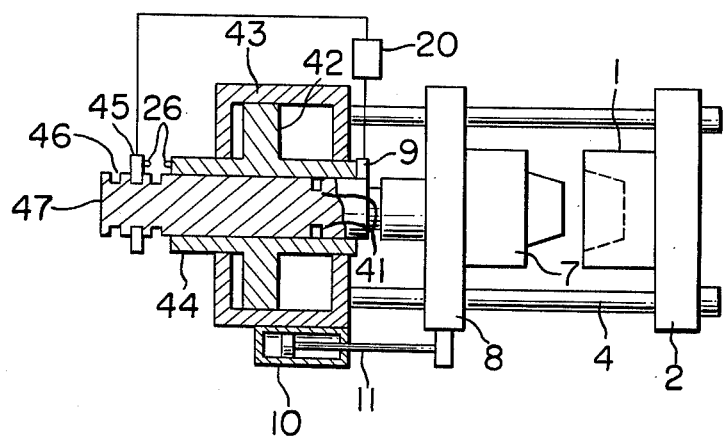
FIG. 4 is a diagrammatic side view, partly in section, of another embodiment of this invention.

In another embodiment shown in FIG. 4, elements designated by reference numerals 1 to 11, 20 and 26 are identical to those shown in FIGS. 2 and 3. In this embodiment, a mold tightening cylinder 43 having a stroke longer than the boost cylinder 10 is secured to the outer ends of tie bars 4. A hollow piston 42 is secured to or made integral with a sleeve 44 contained in the cylinder 43. A compression rod 47 is slidably contained in sleeve 44 and one end of compression rod 47 is secured to the lefthand side of movable die plate 8 which is reciprocated along the tie bars 4 by the piston rod 11 of boost cylinder 10 which is secured to the bottom of the mold tightening cylinder 43. The other end of the compression rod which protrudes beyond sleeve 44 is provided with a plurality of axially spaced circumferential grooves 46 to receive a stop ring 45 also divided into two halves. In this example, the locking member 9 is mounted on the righthand side of the sleeve 44 to be slidable in the radial direction. When advanced radially inwardly the locking member 9 engages one of a plurality of axially spaced circumferential grooves 41 provided for compression rod 47 for locking piston 42 thereto immediately before the operation of cylinder 43.

In operation, pressurized liquid is admitted into the lefthand chamber of the boost cylinder 10 to advance the movable die plate 8 and the movable mold 7 to the right. At an intermediate point of this movement stop ring 45 engages the lefthand end of sleeve 44 so that the sleeve 44 is also moved to the right together with piston 42. During this movement the locking member 9 is advanced inwardly by the electric actuating means 20 described above thus locking piston 42 to compression rod 47. In this case the electric actuating means is mounted on the piston 42. In this manner, by the time when the piston in the boost cylinder 10 completes its stroke so that the movable mold 7 has been brought to abut the stationary mold 1, the piston 42 has already been locked to compression rod 47. Accordingly, it is possible to urge movable mold 7 against stationary mold 1 under a high pressure at the same time or immediately after engagement of the molds. In other words, no additional time is required for locking the movable die plate to the piston of the mold tightening cylinder, thus decreasing the overall time required for the operation of the injection molding machine or the die cast machine.

I claim:

1. In a molding machine including a stationary mold mounted on a stationary die plate, a movable mold carried by a movable die plate movable along at least one tie bar, a boost cylinder coupled to said movable die plate for moving and forcing said movable die plate toward and away from said stationary die plate, at least one mold tightening cylinder coupled to said tie bar for urging said movable mold against said stationary mold with a force greater in magnitude than said boost cylinder, and a locking member for locking said movable die plate to said tie bars, an improvement comprising electric contacts arranged and configured to be closed by the movement of said movable die plate before said movable mold engages said stationary mold, and electric actuating means energized by an electric signal generated by the closure of said contacts for actuating said locking member while said movable mold is still moving toward said stationary mold.

2. The improvement according to claim 1 wherein said locking member comprises a first member mounted on said movable die plate to be movable toward said tie bar, and a second member formed on said tie bar to be engaged by said first member.

3. The improvement according to claim 2 wherein said mold tightening cylinder is provided with a piston connected to one end of said tie bar, and said improvement further comprises a supporting plate connected to the other end of said tie bar, a rod connected to said movable die plate and slidably extending through said supporting plate, and a stop member mounted on the end of said rod protruding beyond said supporting plate, and wherein said electric contacts are functionally mounted on said stop member and said supporting plate to make selective contact.

4. The improvement according to claim 3 further comprising a plurality of longitudinally spaced circumferential grooves on the protruding end of said rod which is removably mounted in one of said grooves.

5. The improvement of claim 2 wherein said mold tightening cylinder has a piston coupled to one end of said tie bar and said improvement further comprises a stop member mounted adjacent said end of said tie bar wherein said electric contacts are mounted on said stop member and said movable die plate.

6. The improvement of claim 1 wherein said mold tightening cylinder has a piston provided with a hollow axial bore and said improvement further comprises a compression rod slidably disposed in and extending through said hollow axial bore of said piston, a stop member mounted on one end of said compression rod distal from said movable die plate, the other end of said compression rod coupled to said movable die plate, said electric contacts functionally disposed on said stop member and piston to allow for selective contact, and said locking member selectively engages said compression rod and is rigidly coupled to said piston.

7. In a molding machine having a stationary mold coupled to a stationary die plate, a movable mold coupled to a movable die plate movable along at least one tie bar, a boost cylinder coupled to said movable die plate to translate said movable die plate with respect to said stationary die plate, at least one mold tightening cylinder coupled to said tie bar to exert a compressive force between stationary and movable molds, an improvement comprising:

locking means for rigidly coupling said movable die plate to said tie bar at a range of relative positions of said tie bar and movable die plate;

a stop member;

electrical contact means disposed at least on said stop member for providing a closed circuit when said movable die plate obtains a position just before said movable mold coupled to said movable die plate contacts said stationary mold coupled to said stationary die plate and when said movable die plate is still being translated toward said stationary die plate;

electric actuating means coupled to said electrical contact means for actuating said locking means in response to said closed circuit provided by said electrical contact means so that said mold tightening cylinder is rigidly coupled to said movable die plate before said movable and stationary molds are in contact.

* * * * *